(12) United States Patent
Janek

(10) Patent No.: US 6,471,104 B1
(45) Date of Patent: Oct. 29, 2002

(54) DEMOUNTABLE WHEELED CONTAINER FOR CARRIER OF A SPORTS UTILITY VEHICLE

(76) Inventor: Nikolas Christian Janek, 9175 Morning Mist, Clarkson, MI (US) 48348

( * ) Notice: Subject to any disclaimer, the term of this patent is extended or adjusted under 35 U.S.C. 154(b) by 0 days.

(21) Appl. No.: 09/640,172

(22) Filed: Aug. 15, 2000

Related U.S. Application Data

(63) Continuation of application No. 09/128,363, filed on Aug. 3, 1998, now Pat. No. 6,168,058, which is a continuation-in-part of application No. 08/713,851, filed on Sep. 13, 1996, now Pat. No. 5,788,135, which is a continuation-in-part of application No. 08/611,124, filed on Mar. 5, 1996, now Pat. No. 5,620,126.

(51) Int. Cl.[7] ................................. B60R 9/06
(52) U.S. Cl. ................. 224/498; 224/282; 224/509; 224/526; 224/527; 220/8; 220/9.2; 220/9.4
(58) Field of Search ................ 224/280, 282, 224/488, 502, 509, 521, 532, 498; 414/462; 220/9.1, 9.2, 9.3, 9.4, 8; D3/305

(56) References Cited

U.S. PATENT DOCUMENTS

| | | | | |
|---|---|---|---|---|
| 1,108,615 A | * | 8/1914 | Paul | |
| 1,869,071 A | * | 7/1932 | McLean | |
| 2,020,766 A | | 11/1935 | Brown | ........................ 150/49 |
| 2,806,563 A | * | 9/1957 | Einhorn | |
| 3,799,228 A | * | 3/1974 | Crawford | |
| 4,813,520 A | | 3/1989 | Lin | ........................ 190/107 |
| 5,620,126 A | * | 4/1997 | Janek | ........................ 224/527 |
| 5,732,866 A | * | 3/1998 | Janek | ........................ 224/527 |
| 5,788,135 A | * | 8/1998 | Janek | ........................ 224/527 |
| 6,168,058 B1 | * | 1/2001 | Janek | ........................ 224/527 |

* cited by examiner

Primary Examiner—Gregory Vidovich
(74) Attorney, Agent, or Firm—Alfred D. Lobo

(57) ABSTRACT

A wheeled container is constructed so as to be demountably secured to a cargo carrier assembly (or "carrier") which is externally carried at the rear of a sports utility vehicle or truck. The carrier includes a support beam to which the container is secured by attachment latches on its rigid base. Two of the attachment latches are pivot latches, allowing the container to be pivotably disposed on the support beam without lifting wheels of the container off the ground. In one embodiment, the container comprises a frameless rigid tub adapted to be secured to the support beam; in another the container comprises a framework of elongated rigid struts, e.g. of metal tubing which may be collapsible within which is secured a rectangular receptacle or "sack" of flexible material. Only a portion of the base of the container is directly supported on the support beam, or supported on pivot pins secured to the base. The width of the wheeled container is chosen so that it can be rolled in an inclined or horizontal position through a doorway of a conventional dwelling, and the length is chosen so that, when loaded on the support beam the container does not obscure the taillights of the truck.

3 Claims, 8 Drawing Sheets

DEMOUNTABLE WHEELED CONTAINER FOR CARRIER OF A SPORTS UTILITY VEHICLE

This application is a continuation of patent application Ser. No. 09/128,363 filed Aug. 3, 1998 issued as U.S. Pat. No. 6,168,058, which is a continuation-in-part application of Ser. No. 08/713,851 filed Sep. 13, 1996 to issue as U.S. Pat. No. 5,788,135, which in turn is a continuation-in-part application of Ser. No. 08/611,124 filed Mar. 5, 1996 issued as U.S. Pat. No. 5,620,126.

BACKGROUND OF THE INVENTION

This invention relates to a wheeled container secured to a support beam of a cargo carrier which is carried externally at the rear of a vehicle, for example, a pick-up truck, minivan, or sport-utility vehicle, individually and collectively referred to as a "truck" hereafter. The container may be generally box-shaped, with rigid base, sidewalls and a cover which is preferably hinged to one side of the periphery of the tub; or, the container may be a collapsible box-shaped crate, the framework of which supports a box-shaped receptacle (familiarly referred to as a "sack") of flexible material within which ample storage space is provided for items not desired inside the vehicle. Used as a container, its tub or sack fully encloses luggage including suitcases, garment bags, golf bags and the like, and protects the luggage against the elements. Used without the sack, the framework may be used to transport a motor scooter, bicycles, water craft, or other relatively large and heavy items which can be demountably secured to the framework, for example with "come-alongs", bunjee cords or other tie-down means.

Numerous solutions to the problem of carrying a large container outside an automobile or truck, at the rear thereof, have been presented over the past six decades or so, each solution depending upon the light in which the problem was perceived. Moreover, the dimensions of the container were rarely accorded much weight. In the assembly comprising a carrier and container, the structure and weight of the container, and also its dimensions, are essential considerations. It is also required that the container be removably mounted, in its transport position, in close proximity to the rear exterior vertical surface of the rear bumper of the vehicle, or the exterior surface of the rear door or hatch, preferably no more than about 15.25 cm (6 inches) therefrom. Use of the carrier and container on a typical passenger automobile is excluded because the support beam is unsuited for such purpose. Examples of support beams are provided in U.S. Pat. Nos. 5,620,126; 5,732,866; and 5,788,135 the disclosures of which are incorporated by reference thereto as if fully set forth herein.

SUMMARY OF THE INVENTION

In one embodiment, a wheeled container is formed as a rigid tub, preferably, provided with a hinged cover, and adapted for use with a cargo carrier for a sports utility vehicle. The cargo carrier comprises a support beam having at least three spaced-apart fastening means referred to as attachment latches secured thereto, and at least two of the attachment latches are "pivot latches" oppositely disposed and spaced apart along the beam's longitudinal axis (x-axis); fixedly secured near the rigid base of the container are (i) two oppositely directed, spaced-apart locking pins protruding longitudinally (along the x-axis) to be matingly received in the pivot latches (first and second fastening means) when the container is secured to the support beam, (ii) a third fastening means transversely disposed from the locking pins to be cooperatingly secured to the support beam, and, (iii) coaxially spaced-apart wheels fixedly secured near one end of the base to allow the container to be rolled in an inclined or horizontal attitude; the locking pins are insertable in the pivot latches from one side of the longitudinal portion of the support beam only, without lifting said wheels off the ground, thereafter to enable the container to be pivoted into a secured position on the support beam which supports the base of the container; the container has a width less than that of a doorway through which it is to be rollingly transported in an inclined attitude, and a length less than the spacing of the vehicle's tail lights.

In another embodiment, a collapsible wheeled container is formed by securing a receptacle or "sack" of flexible material to a rigid framework which may be collapsed. Preferably the flexible material is also foldable when the framework is collapsed. The framework includes a rigid base and foldable sides, all preferably formed from rigid elongated struts ("frame-struts"), for example of metal angle stock or tubing. The sack, which when fully opened is a generally rectangular parallel-piped, may be secured on and within the inside of the framework by attachment means such as strings secured in grommets adapted to be tied to the sides of the frames. VELCRO® hook and loop fastener ties, snaps or lacing. Preferably, the sack is provided with a pair of opposed double-walled sidewalls which function as rectangular sleeves into which each opposed rectangular sideframe is fitted. Access to the container is provided with a zippered closure flap in a manner analogous to the opening in a backpack. The sack may be removed from the framework which may then be used as a dolly. Large items may be mounted on the sackless framework which in turn, may be pivotably disposed upon and secured to a support beam carried at the rear of a vehicle. As in the prior embodiment, to secure the wheeled collapsible container easily and quickly to the support beam, it is essential that the base be provided with locking pins adapted to be matingly locked into the pivot latches carried by the beam, and a pair of co-axially spaced-apart wheels fixedly secured near one end of the base to allow the framework to be rolled in an inclined attitude.

It is therefore a general object of this invention to provide both, a rigid multi-functional container with fixed external dimensions when placed in service, which container can be demountably secured to the support beam of a cargo carrier by means of pivot pins on the container's base, and mating pivot latches on the support beam; and, when not in service, a collapsible container which can be stored in a relatively small space. When not being transported, the special-purpose container may be used solely as such, as a rigid tub with a hinged, lockable lid, or, with its sack always held by the framework. In an alternative embodiment of the collapsible container, the sack is removably disposed on the framework. But in each case, the width of the framework is less than that of a doorway through which it is to be rollingly transported in the framework's "opened" position, and the length of its telescopably opened base is less than the spacing of the truck's tail-lights.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Numerous suggestions for carrying a container on a support beam have been proffered to date, but none for a wheeled container designed and constructed to allow it (i) to be pre-loaded conveniently, for example with luggage, in a room of a house or motel/hotel (referred to as a "dwelling"); (ii) to be wheeled in an inclined or horizontal position through conventional doors of the dwelling (such doors are generally about 30 inches or 76 cm wide) to a position near the support beam; then, without lifting the container off the ground, (iii) to be pivoted on cooperating pivot means (fixedly disposed on both the container and the support beam) to lock the container on the support beam, manually, by a single person of average strength, without using tools. Upon arriving at one's destination dwelling, the person may unload the container by (i) unlocking the locking means and pivoting the container without lifting it off the support beam, so that the wheeled end of the container contacts the ground, then (ii) wheeling the container through conventional doors into the dwelling so that the luggage is transported from the truck in a single trip. The wheeled container, is specifically designed to cooperate with a support beam, so as to permit luggage and goods to be easily and conveniently transported to a destination, then wheeled into a dwelling. This avoids leaving the contents of the container unattended outdoors, albeit still within the container which is typically provided with a lid or cover locked to the body of the container.

Figure 1:
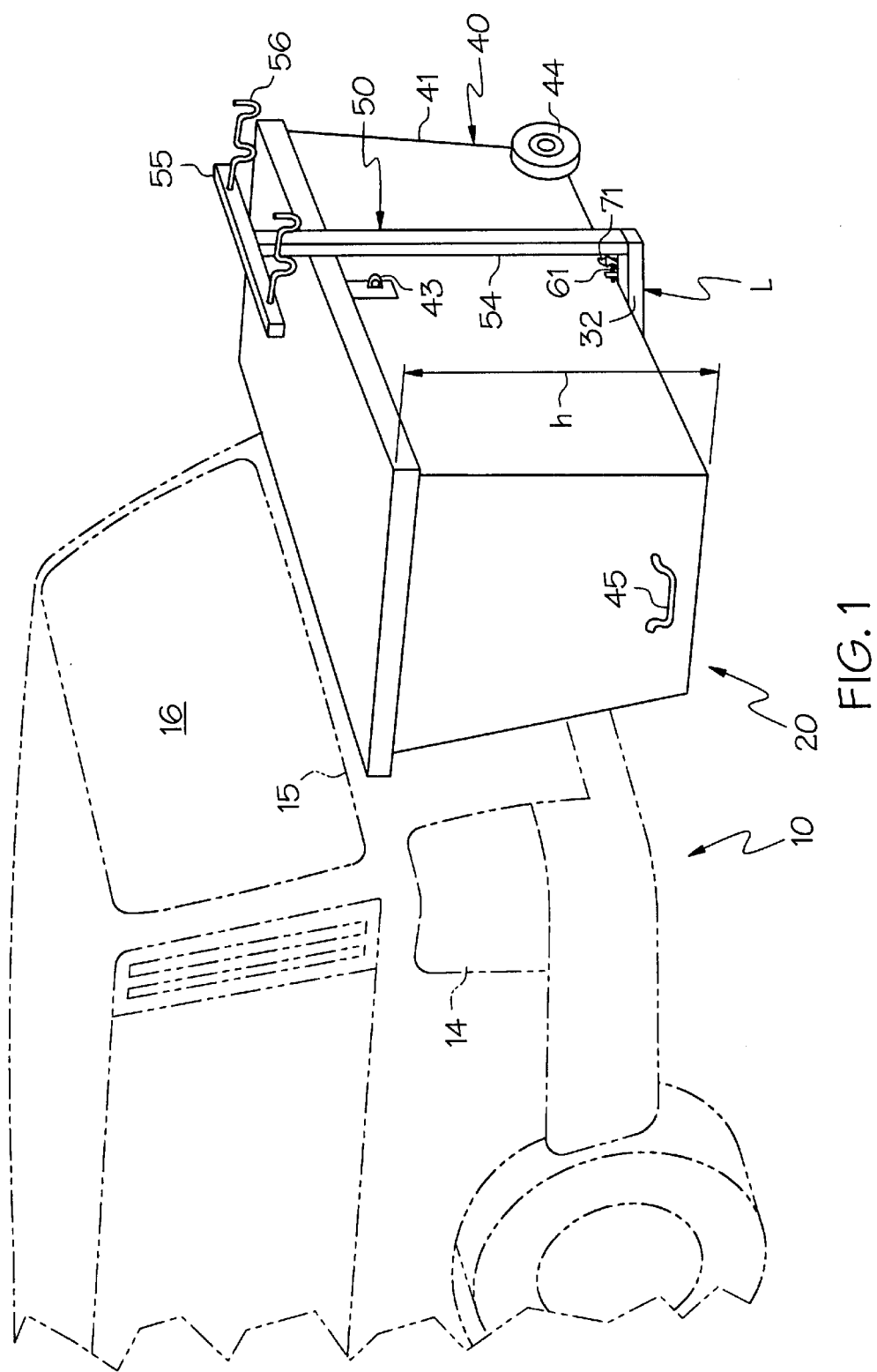
FIG. 1 is a generally schematic view of the carrier in transport position, the carrier including a L-shaped frameless rack a wheeled container and an optional T-shaped accessory rack all carried behind a 4×4 sports utility vehicle provided with a socket for a trailer hitch fixedly attached to the frame of the vehicle.

Referring to FIG. 1. there is shown a 4×4 sport utility vehicle, indicated generally by reference numeral 10, to which a carrier assembly, indicated generally by reference numeral 20 is removably attached. Typical of such sport utility vehicles are the Chevrolet Blazer the Ford Explorer, and the Nissan Pathfinder. Other suitable vehicles are pick-up trucks such as the Dodge Ram, the Ford F150 and the Chevrolet C-1500 or K-1500. Still other suitable vehicles are vans and minivans. The "carrier assembly" 20 refers to a combination of L-shaped support beam L, and the wheeled container indicated generally by reference numeral 40, which is secured to the support beam with attachment latches two of which also serve as pivot means. Optionally, for use as a bicycle carrier, ski support beam and the like, a removably mounted, accessory support beam 50 of arbitrary construction, preferably having a vertical T-shape, with appropriate accessory suspension means, is provided.

Figure 2:
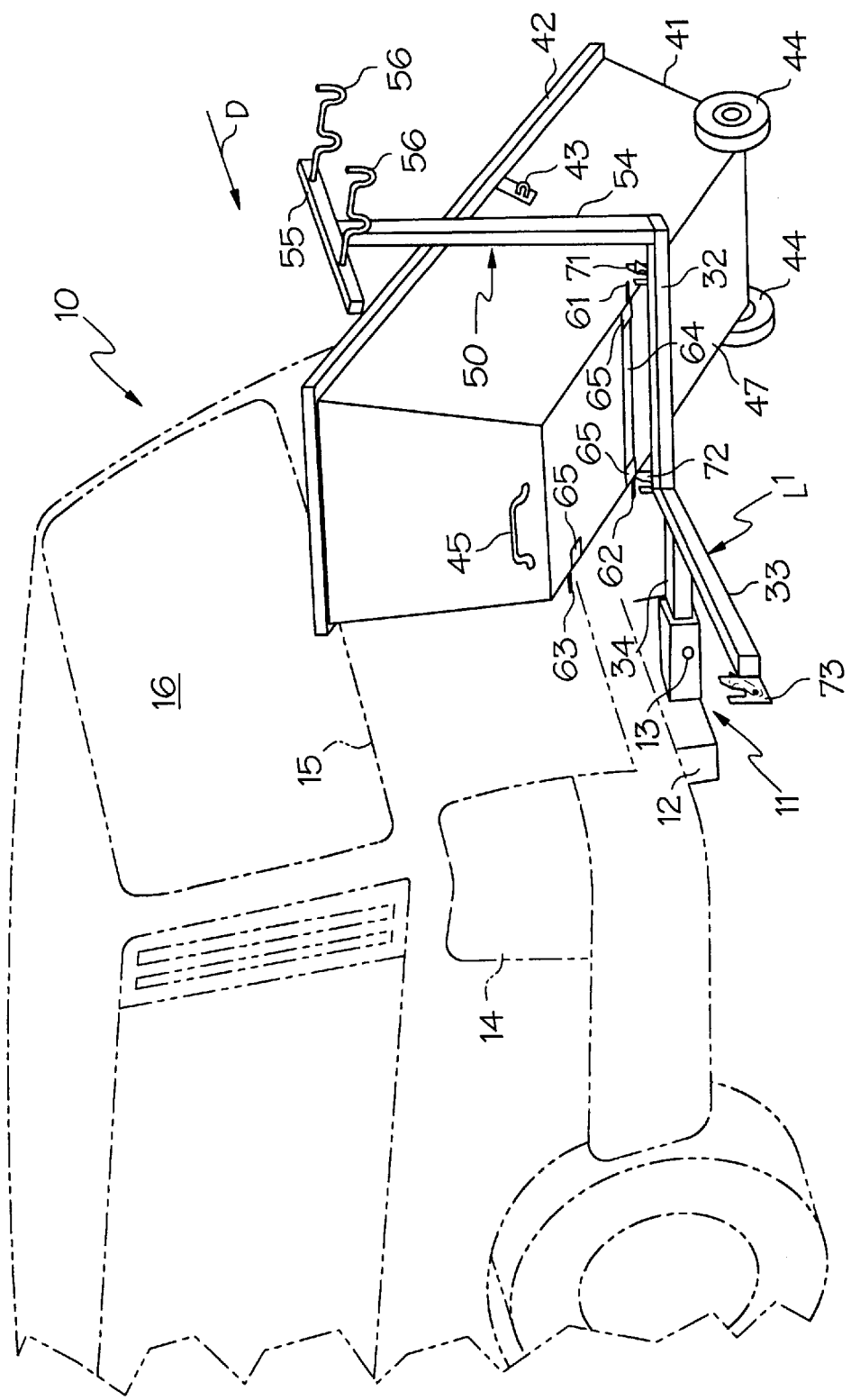
FIG. 2 is a generally schematic view of the container as it rests in position to be pivoted onto a first embodiment of the rack comprising an integral planar L-shaped support beam $L^1$, the beam being connected to the truck with a shank. If desired, the accessory rack shown in position, may be positioned before or after the container is positioned. Locking pins on or near the bottom of the tub of the container are held in a pair of oppositely disposed pivot latches along the longitudinal axis of the rack so that the container may be pivotably disposed on the longitudinal strut of $L^1$.

Referring to FIG. 2, there is shown one embodiment of an L-shaped support beam $L^1$ comprising struts 32 and 33, removably connected to the truck's frame 12 with a short connection stub or shank 34 and the wheeled container 40 which, in the embodiment shown, can only be loaded onto $L^1$ in the direction of the arrow D, that is, from the right hand side (the passenger's side) of the truck.

The carrier assembly 20 comprises the L-shaped support beam $L^1$ and the container 40 having a tub 41 of specified critical volume in the range set forth above, the tub being provided with a lid 42, preferably hinged. The tub 41 is generally a parallelpiped and the hinged lid 42 is preferably provided with a hasp 43 to lock the container. The container can only be loaded or unloaded from the top when the lid is in the upright position. If loaded with suitcases, plural suitcases may be ganged, positioned so that handles of the suitcases are uppermost. A typical suitcase (not shown) is loaded with its longer dimension along the x-axis so that the depth of the tub is from 10% to 50% greater than the height of the suitcase placed within the tub, but the depth is such that the height "h" of the container 40 with the lid 42 closed, is preferably no greater than the distance of the lower edge 15 of the rear, window 16 from the upper surface of $L^1$. The width of the tub (measured along the longitudinal x-axis) is typically at least as wide as the longest dimension of a typical suitcase. The length of the tub (measured along the y-axis) is less than the distance between the inner edges of the rear tail-lights 14 (only one of which is shown), so the tail-lights are visible from the rear when the container is on the support beam. It will now be evident that tub 41 will be longer than it is wide, and its width is limited by the width of a doorway through which the container is to be wheeled. Of course smaller containers may be constructed if the use of the maximum volume afforded by the dimensions of the rear of the vehicle is not needed.

Though a tub of conventional construction may be used, in one preferred embodiment, the tub has no planar framework either internally or externally (hence "frameless tub") to support the load carried in it, and when transported on the truck, the tub is preferably secured with a pair of attachment latches in addition to the pair of pivot latches. The container may be loaded indoors with so much luggage that the container cannot be lifted off the ground by only one person; thus, goods including luggage, may be conveniently arranged within the tub with due care while indoors, irrespective of weather conditions outdoors, so that optimum packing is achieved for the travel conditions expected, and the container may then be wheeled outdoors through the doorways.

Such containers are commercially available either formed from GFR plastic, or of thermoformed acrylonitrile-butadiene-styrene ("ABS") copolymer. For optimum rigidity and light weight the container may be made of a suitable synthetic resin reinforced with whiskered carbon fibers using technology conventionally used in the fabrication of golf clubs, tennis support rackets and certain military aircraft. Casters 44, preferably solid rubber wheels, are provided along a common longitudinal axis, directly or indirectly secured to the tub, preferably on an axle disposed near one end of the base, near opposed lower corners of the tub near its one end. Preferably, the wheels are disposed exteriorly of the base and end-walls without being recessed therein. The manner in which the wheels 44 are fixedly attached to the tub 41 is not critical but for optimum adjustability, namely to minimize the vertical distance through which the tub is to be pivoted onto the longitudinal strut 32, it is preferred to use telescopable wheels. At its other end, the tub 41 is provided with a handle 45 with which sufficient force is applied to rotate the container in a vertical plane at right angles to the longitudinal axis, onto the support beam.

The container 40 typically has a rigid unitary body with an internal volume in the range from about 10 ft$^3$ (cubic feet) to 30 ft$^3$ and is too large to be carried exteriorly of a conventional automobile; and, if the container is used for its intended purpose as described herein, the loaded container transported on an automobile would adversely influence the normal operation and handling of the automobile.

The tub 41 has substantially vertical walls and an integrally formed, generally planar base 47, preferably of glass fiber reinforced ("GFR") synthetic resinous (plastic) material, a metal composite or aluminum. Alternatively, the tub may be formed from a substantially rigid unreinforced plastic material. By "substantially rigid" is meant that the tub, upside down, can support a load of about 300 lb (136 Kg), or the weight of two average persons standing or sitting on the tub's planar base with no readily visible deflection of the base or walls. The tub is preferably rigid enough to be supported on its locking pins without also supporting the lower surface of its planar base, though, to minimize stresses on the base, it is preferred to support the planar base when the locking pins are secured in their attachment latches. A preferred container is 117 cm long×68 cm wide×71 cm deep (46"×27"×28") and has an interior volume sufficient to carry plural suitcases and/or other personal effects, such as hiking or biking gear (collectively referred to as "luggage" hereafter), which would not only occupy too much space if stored within the vehicle, but would also be required to be handled individually for loading and unloading into the truck. A suitable tub for a container is commercially available from Better Way Products Inc., New Paris, Ind. 46553.

When the wheeled container 40 is positioned on $L^1$, the container's length (longest dimension) lies on strut 33 along the transverse y-axis; its width lies on strut 32 along the longitudinal x-axis; and its depth lies along the z-axis. The wheeled container 40 can be rolled along the ground in an inclined position, preferably on a pair of wheels 44 mounted, optionally vertically telescopably, one on each side, near each lower corner at one end of the container's base.

Positioned about midway between the handle 45 and the common axis of the wheels 44 are oppositely disposed, substantially co-axial pivot locking pins 61, 62 which are matingly received in pivot latch means 71 and 72 when the tub is wheeled against the longitudinal strut 32, without lifting the wheels off the ground. The distance of the mounting axis of the pivot pins 61, 62 from the axis of the wheels is therefore at least the same as the height at which the pivot latches 71, 72 are mounted. The locking pins are located along an axis above the coaxial wheels, at a distance which is at least the distance of the pivot latches above the ground upon which the wheels rest. The locking pins 61, 62 and 63 are typically in the range from about 0.65 cm to about 1.6 cm in diameter, about 1.25 cm being preferred; and in the range from about 2.5 cm to about 7.5 cm long, about 5 cm being preferred. Such pins are conveniently provided on small laminar pads which are fixedly secured to the base. Pads may be in the range from about 2.5 cm×2.5 cm to about 10 cm×10 cm, about 5 cm×5 cm being preferred. The thickness of a pad 65 secured to the base preferably corresponds to the diameter of the pin, the pin projecting from the edge of the pad as shown in FIG. 2. Pads may be secured to the side-walls of the tub, near the base, if the height of the slots in the pivot latches dictates. Pads secured to the sidewalls of the tub, adjacent the base, will have pins projecting at right angles to the surface of the pad secured to the sidewall. Most preferably, the locking pins 61 and 62 are provided on the ends of a rigid strap 64 fixedly secured to the base, which strap locates these pins accurately. The pads and/or strap may be secured to the base with adhesive or with a fastener which is inserted through the base.

The container 40 is secured on the support beam $L^1$ with at least two longitudinally (x-axis) opposed mating attachment means, and preferably three, fixed on the tub and support beam, and two of the attachment means are pivot means. At each location, the upper portion of the locking means is fixed on the tub's side-wall just above the tub's planar base 47, but more preferably, is fixed to its base, and the lower portion is fixed to the struts of the support beam. The upper portion comprises the two spaced apart, opposed mating pivotable portions, such as locking pins 61 and 62, each of which is matingly held in a pair of spaced-apart pivot latch means, namely container pivot latches 71 and 72 respectively. The spacing of the pivot latches corresponds to the width of the base of the tub, and is typically slightly greater than the width so as to allow the tub to be pivotably located between the two pivot latches. Preferably the upper portion comprises a third locking pin 63 to be matingly held in a third container attachment latch 73. Alternatively, a hasp may be used, one portion of the hasp secured to the tub 41 and the other to the strut 33; or, a clevis through the upper portion of which a bolt is secured. As will be evident, for safety, the tub preferably carries, fixed securely thereto, the upper portion of a mating locking means, and the lower portion is positioned on strut 33, preferably near the end thereof. The particular fastening means used is not narrowly critical being chosen for conveniently securing the container on the transverse strut 33.

The locking means locks the container at two oppositely disposed positions in the mid-portion of the base, preferably near the longitudinal mid-line (x-axis) of the tub, and at a third position near the end of a transverse (y-axis) strut of the support beam so that the tub is supported for transport along one edge of its planar base, and across its mid-line, only. The mid-line refers to a line drawn along the x-axis near or through the line dividing the planar bottom in halves. The tub is provided with a handle 45 to pull or push the container, and to exert the force necessary to pivot the container onto the support beam. It will be evident that the force required to pivot the container about the longitudinal strut of the support beam is a function of the distance from the handle to the mid-line along which the locking pins are located. The greater this distance from handle to mid-line, the less the force required. But the distance from the mid-line to the axis of the wheels on the bottom of the container determines whether the locking pins can be inserted in the pivot latches on the longitudinal strut without lifting the container off the ground. With vertically telescopable wheels, the locking pins on the tub can be positioned so that the pins may be inserted in the pivot latches, and the tub pivoted into position with a minimum of force.

Reverting to FIG. 2, the socket 11 typically has a square cross-section in which the hollow square tubular interior measures about 5.1 cm×5.1 cm (2"×2") which is just large enough to slidably receive the square tubular shank 34. The overlying support beam 32 is preferably also about 2"×2". Near one end of the support beam 32, which end is distally disposed relative to tubular socket 11 fixedly secured to the frame 12 of the vehicle, is provided a vertical mounting stub 51 of rectangular tubular steel into which the accessory support beam 50 may be removably slidably disposed. Near the other end of support beam 32, the tubular shank 34 slides into the rectangular tubular steel socket 11. The support beam 32 is at least as long as the planar base 47 is wide, and the forward edge of the base is generally parallel to, and in close proximity with the bumper.

As shown in FIG. 2, the accessory support beam 50 comprises a vertical tubular post 54, preferably of rectangular stock into the base of which, stub 51 is insertable, and the base is provided with matching passages (not shown) to allow fastening pins to be inserted through the passages when aligned with passages 52 and 53 in the stub 51. The top of the post 54 is secured to a cross-member 55 on which connecting means for accessories, such as suspension hooks 56 (shown), or clamps for skis, are provided for carrying the particular accessory. The simple construction of the accessory T-support beam lends itself exceptionally well to be combined with the support beam of this invention.

Figure 3:
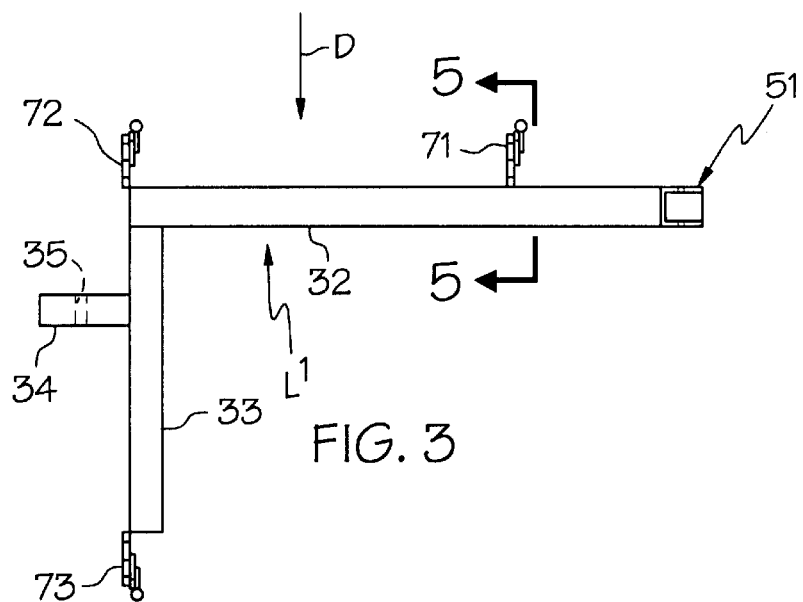
FIG. 3 is a plan view of the L-shaped support beam without the T-shaped accessory rack showing the use of the two pivot latches and an additional spaced-apart locking means such as an attachment latch.

As schematically illustrated in FIG. 3, $L^1$ is an integral support beam having only a longitudinally (x-axis) extending strut 32 and a transversely (y-axis) extending strut 33. By "integral" is meant that the struts of $L^1$ are fixedly secured, for example, by being welded. If desired, the support beam may have a pivotable strut as shown in the '126 patent; a telescopable beam as shown in the '866 patent; or a monorail as shown in the '135 patent.

As shown in FIG. 2, the accessory carrier 50 comprises a vertical tubular post 54, preferably of rectangular stock into the base of which stub 51 is insertable and the base is provided with matching passages (not shown) to allow fastening pins to be inserted through the passages when aligned with passages 52 and 53 in the stub 51. The top of the post 54 is secured to a cross-member 55 on which connecting means for accessories, such as suspension hooks 56 (shown), or clamps for skis, are provided for carrying the particular accessory.

Referring to FIGS. 2 and 3, the tubular socket 11 and shank 34 are each provided with matching through-passages 13 and 35 respectively, preferably in the transverse direction, through which a cross-bolt or fastening pin is to be inserted and secured in the usual manner with a locking Cotter pin (not shown). The socket 11 typically has a square cross-section in which the hollow square tubular interior measures about 2"×2" which is just large enough to slidably receive a square tubular shank 34. It is essential that each latching means be an attachment means to both, receive a locking pin, then secure it; and, that the locking pin be pivotable (hence "pivot pin") in two of the latching means ("pivot-latches") which are spaced-apart on the longitudinal strut of the rack. Thus two spaced-apart pivot latches 71 and 72, and more preferably a third attachment latch 73, are provided on the support beam, preferably by welding them in positions so as to each matingly receive a pivot pin and a locking pin introduced in the desired direction whether vertically or horizontally. Most preferred latching means is one such as pivot latch 71 commonly referred to as an "attachment latch" shown in greater detail in FIG. 5A, as viewed in the direction A—A in FIG. 3.

Figure 4:
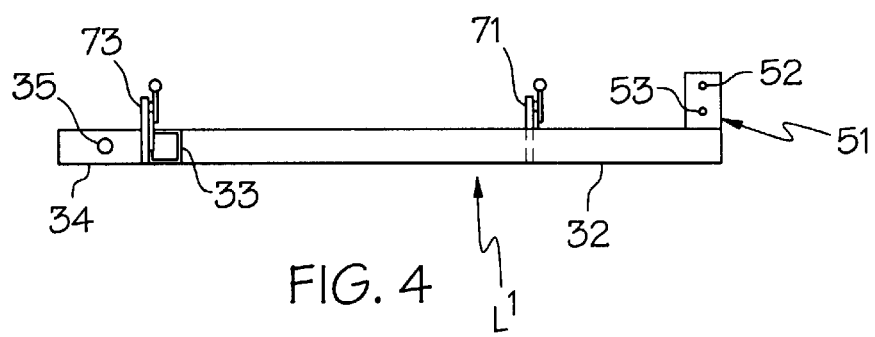
FIG. 4 is a side elevational view of the L-shaped support beam shown in FIG. 3.

Referring to FIG. 4 there is shown a side elevation view of $L^1$ in which only two pivot latches 71 and 72 are used. The third fastening means on the strut 33 may be provided by a bungee cord around the container and the strut. Preferably, the third fastening means is an attachment latch 73. If accessory rack 50 is to be mounted, a stub 51 is provided with a pair of vertically spaced apart matching through-passages 52 and 53 respectively, preferably in the transverse direction, through each of which a fastening pin is to be inserted and secured in the usual manner with a locking Cotter pin (not shown).

Figure 5:
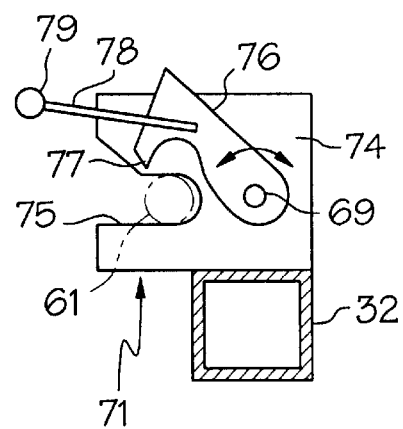
FIG. 5 is a detail of a locking pin (shown in phantom outline) in an attachment latch in use as a pivot latch fixedly secured on the upper surface of a longitudinal strut, with the latch's U-shaped slot opening to one side, the latch in a horizontal position.

Referring to FIG. 5, pivot latch 71 comprises a laminar plate 74 having a horizontal, generally U-shaped slot 75 with one of its sides (the upper) flared upward to facilitate guiding a locking pin 61 into it. The locking pin 61, shown in phantom outline, is releasably held in the U-shaped slot by a pivotable catch 76, such as either a manually actuated, or a spring-loaded pawl having a hooked end 77 which fits over the locking pin 61. In the manual mode, the catch 76 is pivotable on a pin 69 about an axis at right angles to the plate 74 with a handle 78 secured to the catch at the end of which handle a ball 79 provides enough weight to hold the catch 76 in position over the locking pin 61. Alternately, the hooked end 75 may be held in place over the pin 61 with a safety pin (not shown). The handle 78 is typically welded to catch 76 at a location which does not interfere with insertion and release of the locking pin in the slot. As shown, pivot latch 71 is fixed to strut 32 so that both the catch 76 and the handle 78 are on the outside of plate 74 so as to allow the tub 41 of the container 40 to be slid between the plates of the latches 71 and 72. Pivot latch 72, constructed in the same manner as pivot latch 71, is similarly fixed to strut 32, with the U-shaped slot 75 in the horizontal position, and its handle 78 on the outside of plate 74. The tub 41 may therefore be received between the opposed plates 74 of pivot latches 71 and 72.

Figure 6:
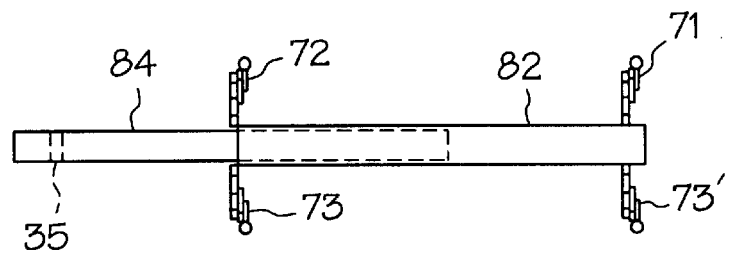
FIG. 6 is a plan view illustrating a monorail with four attachment latches.

As shown in FIG. 3, a third latch, attachment latch 73, constructed in the same manner as pivot latches 71 and 72, is similarly fixed to strut 32, at the end thereof, except that the U-shaped slot 75 is in the vertical position, shown in the detail schematic illustration FIG. 6, open at the top to accept a locking pin lowered into the opening, and as before, both the catch 76 and handle 78 are on the outside of plate 74. The distance along the strut 33 at which attachment latch 73 is located is not narrowly critical, being chosen so as to matingly receive locking pin 63 located near the end of the base. The orientation of the U-shaped slots in latches 71, 72 and 73 is likewise not narrowly critical, and may be in either the horizontal or vertical position, but for safety, at least one, and preferably all three of the latches used on the U-shaped support beam should be positioned with the U-shaped slot in an upwardly inclined, preferably vertical, position as shown in FIG. 2, to ensure that the container 40 is securely and safely held in position.

It will now be evident that if the L-shaped support beam was constructed and mounted in mirror-image relationship with the beam illustrated in FIGS. 1, 2 and 3 the pivot latches would be secured on the driver's side and the container could be loaded from that side only.

Figure 7:
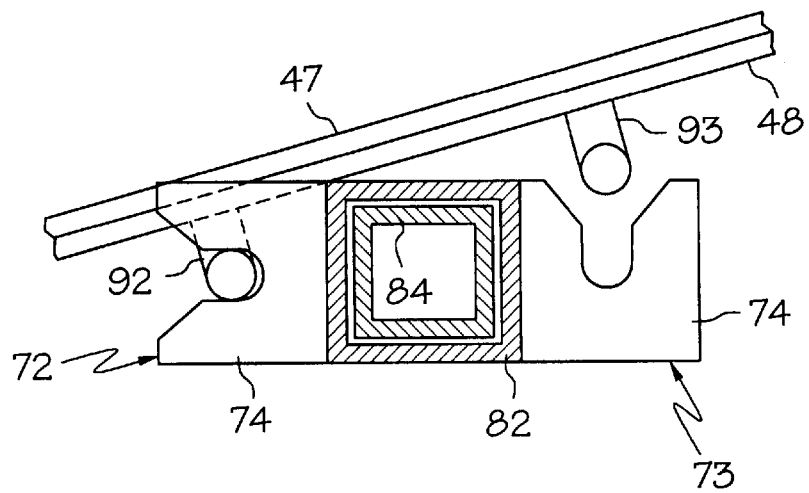
FIG. 7 is a side elevation view of the beam in FIG. 6, the beam in cross-section, having a container with L-shaped pivot pins being pivoted into (or out of) the latches on the beam.
Figure 8:
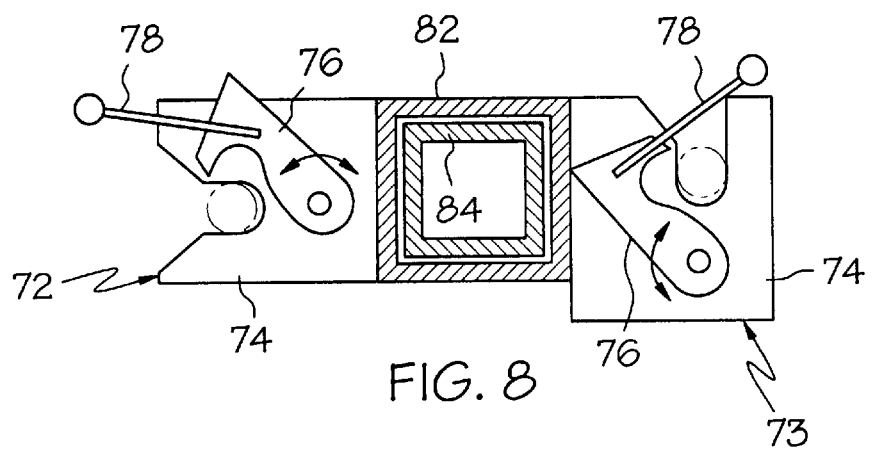
FIG. 8 is a side elevation view of the beam in FIG. 6, the beam in cross-section, showing how the attachment latches secure the pivot pins in position.

FIGS. 6, 7 and 8 illustrate a monorail support beam comprising an outer support beam 82 and an inner slider shank 84. Here it is preferred to use a metal plate 48 on the bottom of the tub, with four locking pins (only pins 92 and 93 are visible) which may be the same or different, to be received in two pivot latches 71, 72 and two attachment latches 73, 73' respectively as shown in FIG. 6. Most preferably, the pins 91 and 92 which are received in the pivot latches 71 and 72 on one side of the beam 82, are the same; and pins 93 and 94 which are received in the attachment latches 73 and 73' on the opposed side of beam 92, are the same, the geometry of the pins depending upon the position and shape of the latches. Once the side for securing the pivot latches is chosen, the container may be loaded and unloaded from that side only.

As illustrated in FIG. 7, L-shaped locking pins 92, 93 are so positioned on metal base plate 48 (preferably by welding) secured to the base 47 of the tub, as to allow the base plate 48 to rest on the support beam 82. In view of the particular pin configuration shown in FIG. 7, it will be seen that various other pin configurations will permit the base plate 48 to rest in contact with the upper surface of support beam 82.

As shown in FIG. 6 locking pins are provided in the 'near' (relative to the loading direction) half of the tub's base so that when held in pivot latches 71 and 72 on support beam 82, the beam extends longitudinally across the base plate. The container is thus supported only on the support beam 82, the container held in the pivot latches 71, 72 and attachment latches 73, 73' by catches 76 (shown in FIG. 8, but not shown in FIG. 7 to avoid crowding in the Fig and confusion).

As shown, the attachment latches 73, 73' are constructed in the same manner as pivot latches 71 and 72, and similarly fixed to support beam 82, opposite pivot latches 71, 72 except that the U-shaped slot 75 is in the vertical position, open at the top to matingly receive locking pin 63 lowered into the opening, and as before, both the catch 76 and handle 78 are on the outside of plate 74. After the tub is pivotedly loaded (with locking pins 61 and 62 in pivot latches 71 and 72) onto the support beam, pin 63 is secured in attachment latch 73 which, as situated, provides no pivotability. The orientation of the U-shaped slots in latches 71, 72 and 73 is not narrowly critical, and may be in either the horizontal or vertical position, but for safety the attachment latch 73 is positioned with its U-shaped slot in an upwardly inclined, preferably vertical, position as shown in FIGS. 2, 3 and 4 to ensure that the container 40 is securely held.

Figure 9:
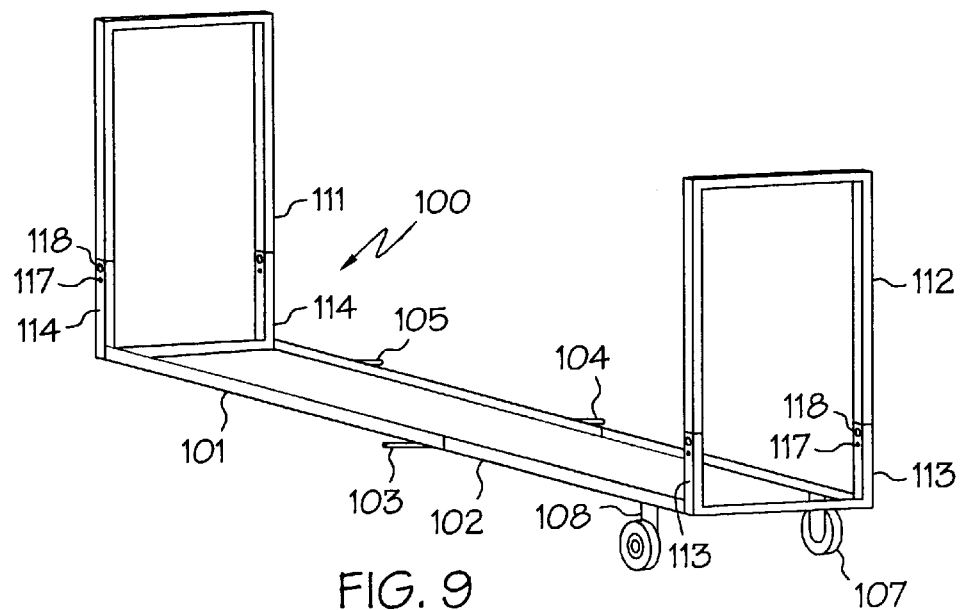
FIG. 9 is a schematic illustration in perspective view of the frame of a collapsible container with foldable end-frames and a telescopable base frame, in which the flexible receptacle (sack) is not shown; pivot pins and a locking pin are secured to the base frame, as is a pair of telescopable wheels.
Figure 11:
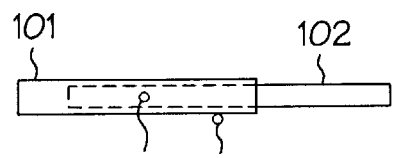
FIG. 11 is a detail showing a pin locking means for the telescopable tubular frame members.

Referring to FIG. 9, there is shown a construction with four U-channel-shaped channel-members 101, 102, 111 and 112 which provide a collapsible framework 100 for a container, the framework comprising a telescopable rectangular base-frame including a pair of base channel-members 101 and 102 the ends of one (102, shown) being slidably received in the ends of the other. When in the fully open position the length of the base-frame (in the transverse direction, when mounted on a support beam) is less than the distance between tail-lights. A pair of oppositely disposed pivot pins 103, 104 and a locking pin 105 are provided on base channel-member 101, the pins positioned to be received in cooperating pivot and attachment latches respectively on the support beam. As illustrated in FIG. 11, the base-frame is locked in the open position with locking pins inserted through aligned apertures 106 near the ends of the channel-members. For economy, it is preferred that angle iron, or rectangular metal tubing, whether rectangular or round, be used for all frame-struts. A pair of vertically telescopable wheels 107 for rotation about a common axis, are mounted on telescopable mounting tubes 108 secured to the base-frame near one end of channel-member 101. The wheels may be mounted without being telescopable, but for ease and convenience to accommodate differences in height of the support beam as a function of the terrain on which the vehicle is stopped, telescopable wheels are preferred.

Figure 15:
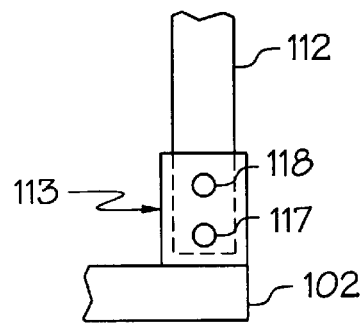
FIG. 15 is a detail illustrating a mounting ear at each corner of the base-frame to matingly receive corner-posts of end-frames, the ear having through-apertures for pins.

At the corners of each of the base channel-members 101 and 102 are provided opposed pairs of vertical mounting ears 113, 114, to each of which is pivotally secured one end of a pair of U-shaped (inverted) channel-members 111 and 112, which when mounted, form rectangular end-frames. The end-frames are not interconnected by side-frames. The ears are preferably welded to the sides of the frame struts of the base channel-members 101 and 102 so as to form a confined rectangular space on the base-frame, within which space a planar base member (not shown) may be disposed, if desired, to provide additional support for goods carried by the frame and to distribute the weight of the goods more evenly over the base-frame. As illustrated in FIG. 15, to be locked in the vertical position, each mounting ear 113 and 114 is provided with a stub-pivot-pin 115 and a locking-pin 116 inserted through vertically spaced apart locking-pinpassages 118 and pivot-pin-passages 117, which receive locking-pins and stub-pivot-pins respectively. To be inwardly collapsed, enough clearance is provided between the bottom of each vertical frame-strut and the connecting base-frame strut.

Figure 10:
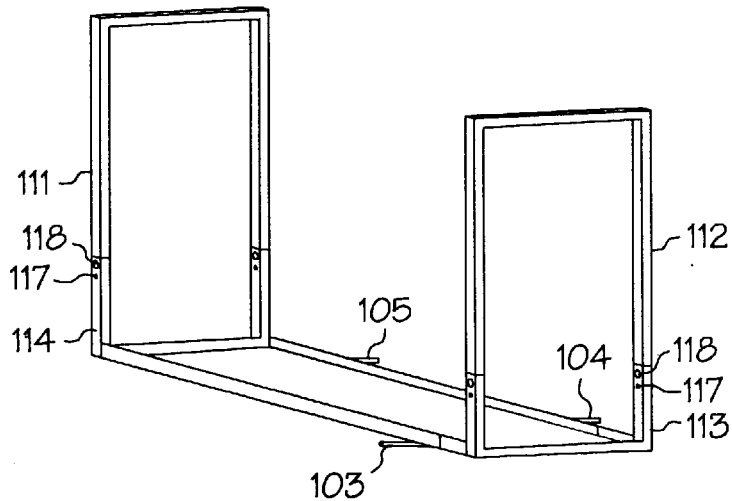
FIG. 10 is a schematic illustration in perspective view showing the frame in FIG. 9 (without the wheels) after the base is telescoped inwardly and the end-frames are not yet folded; an optional base plate adapted to be fitted between the transverse base-frame members, if used, has been removed.

Referring to FIG. 10, the base-frame is shown (without the wheels) in a closed position with the arms of channel-member 102 telescoped within the arms of channel-member 101, before the end-frames 111, 112 are folded.

Figure 12:
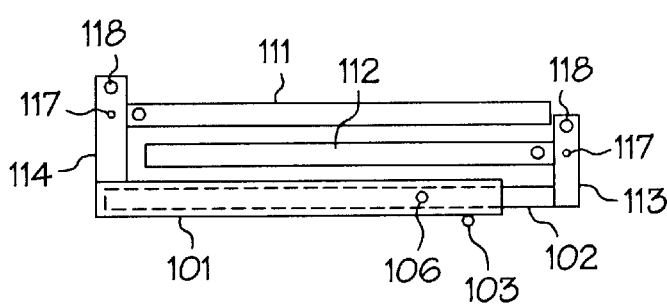
FIG. 12 is a side elevation view showing the frame in FIG. 9 in the fully collapsed position in which the end frames are pivotable inwardly only at different heights to allow one frame to overlie the other.

As illustrated in FIG. 12, which shows the base-frame in a closed position, mounting ears 113 are shorter than ears 114 and the pivot-pin-passages 117 for the pins through channel-member 112 are relatively closer to the base-frame than are the pivot-pin-passages in ears 114, the latter being above the height of channel member 112 in the folded-down position. Thus when channel-member 112 is pivoted and lowered onto the base-frame, channel-member 112 may be folded down to overlie the upper surface of channel-member 112. Though the heights of the end-frames is the same, as will be evident, the length of each arm of channel-member 111 will be less than the length of the closed base-frame.

Figure 13:
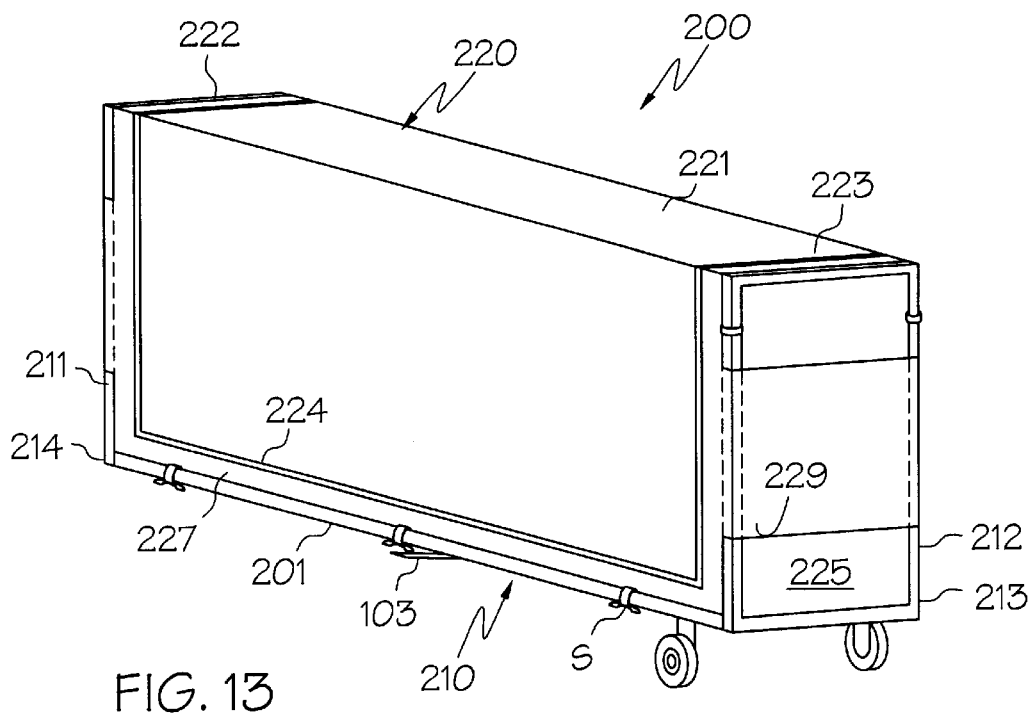
FIG. 13 is a perspective view schematically illustrating the container with a first embodiment of a sack of flexible material secured within the frame.
Figure 16:
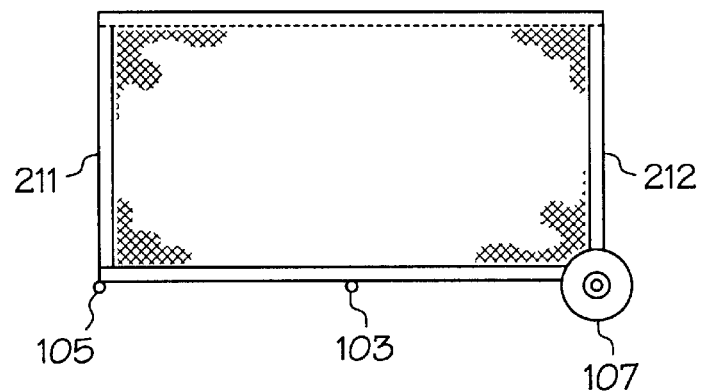
FIG. 16 is a side elevation view illustrating a collapsible container, on or within which is fitted a sack having an upper closure flap the periphery of which has a zipper means near the top to provide access into a rectangular compartment.
Figure 17:
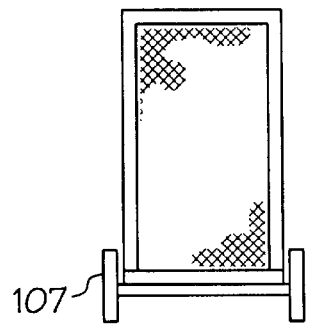
FIG. 17 is an end elevation view of the container shown in FIG. 16.

Referring to FIGS. 13, 16 and 17 there is illustrated a container generally (shown without its wheels) indicated by reference numeral 200, comprising a frame-work 210 within which is held a sack 220. When the sack is distended, it has a generally rectangular cross-section with end-walls 225, 226 (not visible) which are narrower than its side-walls 227, 228 (not visible). The construction of the sack is preferably of water-resistant or water-impervious material, preferably a fiber-reinforced synthetic resinous material or canvas which is foldable. Each side-wall is provided with a sleeve 229, open at its top and bottom, formed by securing the ends of a wide strap of material near opposed vertical edges of the container. Each channel-member 211 and 212 is snugly received in the sleeves 229 so formed. The base of the sack is thus extended between the channel-members 211 and 212, and the edges of the base are supported on base-frame 201, thus providing a rectangular compartment into which luggage or other goods may be stored. Access is provided through the top of the sack which is opened and closed by a slide fastener extending around the side-walls of the sack. The channel-members are pivotable mounted on mounting ears 213, 214 and inwardly foldable on a rectangular base-frame 201 which, in this embodiment shown, does not have telescopable side-struts. As before, the base-frame 201 is provided with a pair of pivot pins 103, 104 (not visible) and a locking pin 105, but the wheels 107 are shown without telescopable mounting tubes.

Figure 18:
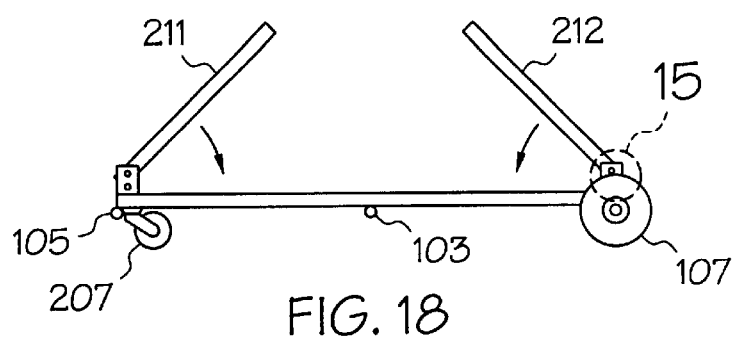
FIGS. 18 and 19 are side elevation views of a container as shown in FIG. 16, fitted with an optional additional pair of casters, illustrating the end-frames being folded onto the base-frame forming a flat assembly.
Figure 19:
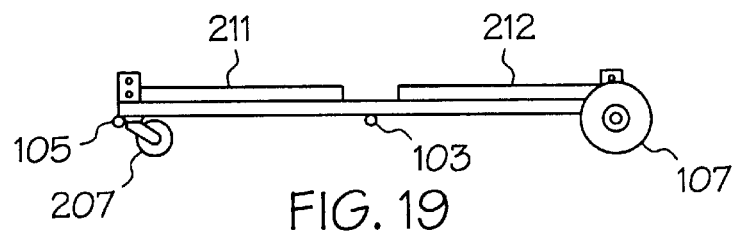
Figure 20:
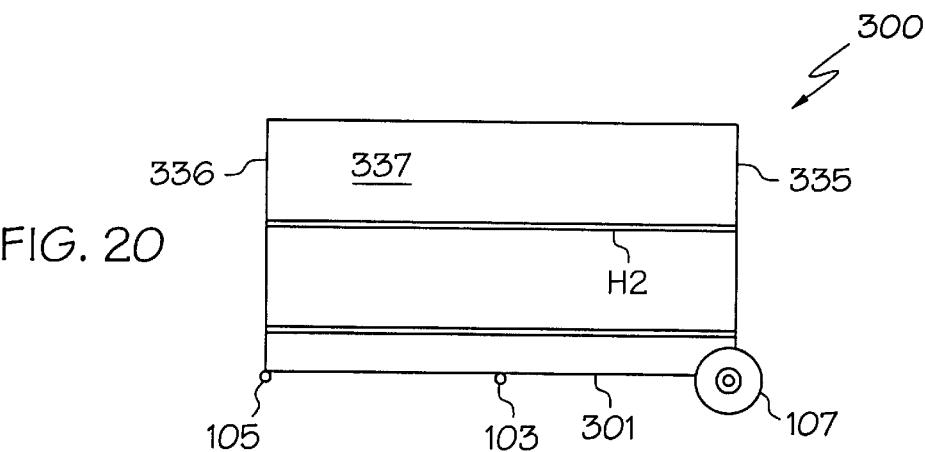
FIGS. 20–21 are side elevation views illustrating a container with a hinged lid, rectangular end-walls or end-frames and hinged side-walls or side-frames, and showing, in phantom outline, how the end-walls fold inwardly against the base.

As illustrated in FIGS. 18 and 19, to fold the end-frames flat onto the base-frame, the transverse length of the base-frame (along the y-axis, when mounted) is at least equal to the combined lengths of channel-members 211 and 212 in their folded-down position, and preferably from about 1% to 10% greater. If the combined lengths is greater than the length of the base-frame, one end of one of the end-frames will overlap the other. If a planar base is inserted between the end-frames to rest on the base-frame, the sack 220 is supported on the planar base. The sack 220 is provided with a closure flap 221 which when open, provides access to the interior. The configuration of the opening, to provide access to the interior of the sack, is not narrowly critical so long as the container when closed provides adequate protection for its contents against the weather, and preferably allows the opening to be locked. In addition to the pivot pins 103, and the opposite pivot pin (not shown), locking pin 105, and pair of wheels 107, the embodiment shown in FIG. 18 includes a second pair of casters 207 to facilitate transport of the container in a horizontal position.

The closure flap 221 covers an opening defined by parallel spaced apart dividing lines 222, 223 in the planar top portion of the closure flap, the dividing lines continuing to form a U-shaped outline 224 in the front side-wall 227 so that the matching edges of flap and opening may be closed and opened by a slide fastener, for example zippers with gripping-tabs having locking-holes in them to enable them to be locked together. Preferably, the corners of the sack as well as the opposed edges of its base are provided with securing means S, such as cooperating Velcro strips, or tie-strings secured in grommets, adapted to be tied to the sides of the frames.

Figure 14:
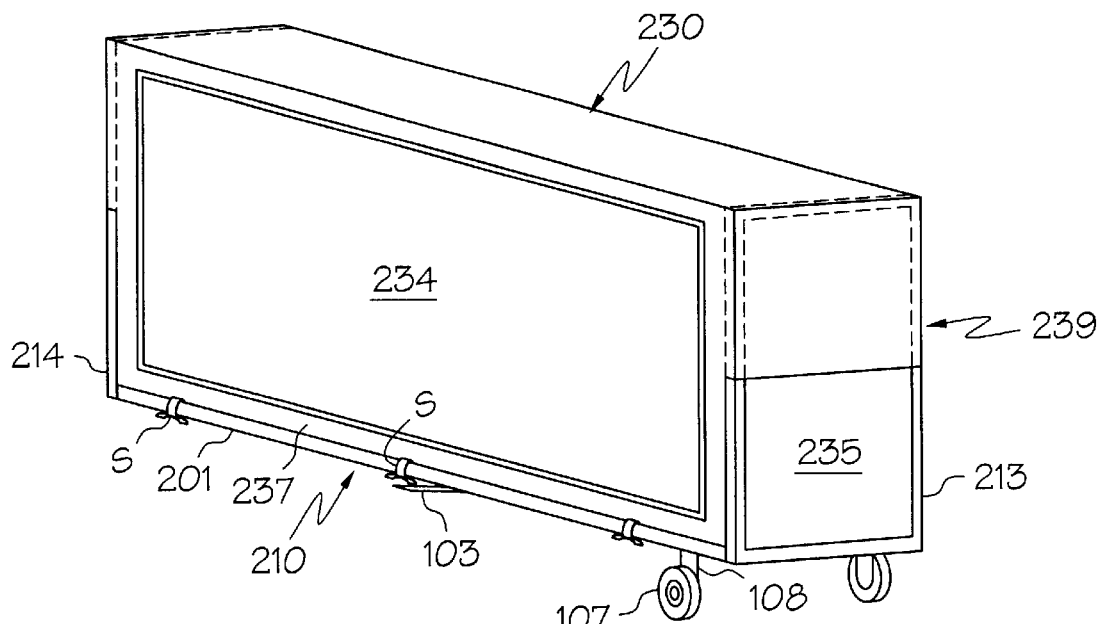
FIG. 14 is a perspective view schematically illustrating the container with a second embodiment of a sack of flexible material secured within the frame.

Illustrated in FIG. 14 is another embodiment of a sack 230 showing a rectangular closure flap 234 with a slide fastener in side-wall 237 to avoid having a zippered portion in the upper wall of the sack. Extensions of upper portions of the side-walls 235, 236 (not visible) may be folded over and secured along the sides, for example by sewing or heat-sealing, to form sleeves 239, closed at their top and open at their bottom, into which each channel-member 211 and 212 is snugly received.

In each of the embodiments above, the upper struts of the end-frames provide adequate purchase to allow the container to be gripped and moved. However, if desired, additional handle means may be provided at the end distally disposed relative to the wheels 107.

Referring to FIGS. 20–23, there is shown an embodiment of a container (the sack secured within is not shown) indicated generally by reference numeral 300 having a base-frame 301, and rectangular U-shaped (inverted) end-frames and side-frames. End-frames are formed when end-channel members 335 and 336 are secured to the base-frame; and the side-frames are formed when side-channel members 337, 338 are secured to the base-frame. Each channel member is constructed with rigid metal tubing, preferably of rectangular or square cross-section. As before, the base-frame is provided with a pair of wheels 107, opposed pivot pins 103, 104 and a locking pin 105.

Figure 21:
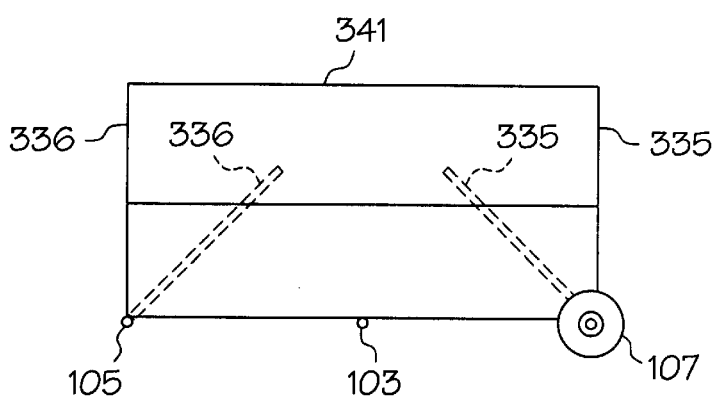

As illustrated in FIG. 21, arms of each end-channel member 335, 336 are pivotably secured at their lower ends to opposed ends of the base-frame to permit the end-frames to be folded inward and downward, as shown in phantom outline, onto the base-frame. Raised into a vertical position and locked therein, each end-frames provides a rigid frame against which the side-channel members 337, 338 are braced so that hinges H1–H4 in their arms are locked in their open positions. In this vertical position, the end-frames and front and rear side-frames form a rectangular compartment into which a sack may be secured, e.g. with Velcro strips spaced apart along the sacks external edges.

Figure 22:
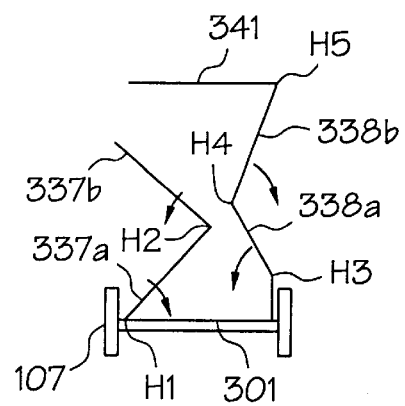
FIG. 22 illustrates the relative positioning of the hinges in the side-frames which permit the container to be folded into a compact flat assembly.

As illustrated in FIG. 22, arms of each side-channel member are hinged to be pivoted about two vertically spaced-apart transverse axes (y-axis, when the container is viewed in a mounted position). As shown, each arm of side-channel member 337 is hinged near opposed corners of base-frame 301 with hinge means H1, to be pivotable inward and downward so that lower segment 337a is folded onto the base-frame; each arm is also hinged at an intermediate location with hinge means H2 between the arm's upper and lower ends, to be pivotable inwards and downward so that upper segment 337b may be folded onto segment 337a. Each arm of side-channel member 338 is hinged above opposed corners of base-frame 301 with hinge means H3, the height of the hinge axis being chosen so that segment 338a is pivotable inward and downward to overlie folded-down segment 337b; the arms are also hinged at another intermediate location with hinge means H4 between hinge means H3 and the arm's upper end, to be pivotable inwards and downward so that upper segment 338b may be folded onto segment 338a. As in the embodiment disclosed in FIG. 18, the combined length of the end-frames 335, 336 is preferably no greater than the length of the base frame 301; if the combined length is greater, the end of one end-frame will overlap the other and the collapsed framework will be less compact than it would be if the combined lengths was slightly less.

A cover-frame or "lid" is provided by another rectangular U-shaped (inverted) lid-channel member 341 having arms hingedly connected to the periphery of the rear doubly-hinged side-frame, and specifically to the upper ends of segment 338b with hinge means H5 so that the lid can rest on the upper periphery of endframes 335, 336 and side-frames 337, 338. The lid is covered, preferably sheathed, in a sleeve of the same flexible material used to make the sack. Since the framework provides a lid, the sack itself need not have a cover over its upper opening.

Figure 23:
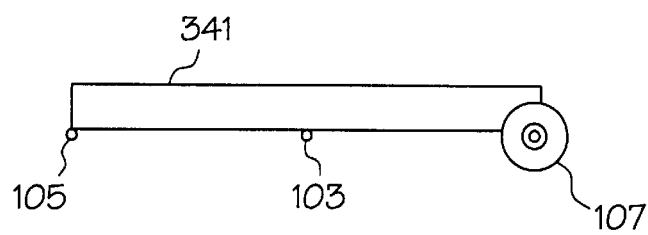
FIG. 23 is a side elevation view of the container shown in FIGS. 20–21 after it is folded into a compact assembly.

As illustrated in FIG. 23, when the end-frames 335, 336 and side-frames 337, 338 are folded down, the lid overlies segment 338b and forms a compact conveniently-stored assembly.

To avoid using a sack, each of the end-frames, each segment of the side-frames, and, the lid may each be made from planar sheets of tough, preferably substantially rigid material, most preferably glass fiber reinforced panels of synthetic resinous material, to form a box with inwardly collapsible sides. Each of the hinges H1–H5 is preferably a piano hinge which extends the transverse width of each side-frame.

Having thus provided a general discussion, described the special-purpose container in detail and illustrated it with specific examples of the best mode of making it, it will be evident that the invention has provided an effective solution to a specific problem. It is therefore to be understood that no undue restrictions are to be imposed by reason of the specific embodiments illustrated and discussed, and particularly that the invention is not restricted to a slavish adherence to the details set forth herein.

I claim:

1. In a wheeled container adapted for use in a cargo carrier for a vehicle having a rear which includes spaced-apart tail lights, the cargo carrier comprising a support beam having at least three spaced apart fastening means secured thereto, two of the at least three fastening means including first and second pivot latch means spaced apart along the longitudinal axis of the beam, the container comprising, a collapsible container having fixedly secured thereto, (i) two oppositely directed, spaced-apart first and second locking pins to be matingly received in the first and second pivot latch means respectively, the locking pins protruding longitudinally, and, (ii) coaxially spaced-apart wheels fixedly secured near one end of the container's base to allow the container to be rolled;

the first and second locking pins being insertable in the pivot latch means from one side of the longitudinal strut without lifting the wheels off the ground, thereafter to enable the container to be pivoted into a secured position on the support beam;

a third fastening means of the at least three spaced apart fastening means, adapted to cooperate with attachment means on the container;

the collapsible container having a width less than that of a doorway through which it is to be rollingly transported, and a length less than the spacing of the vehicle's tail lights;

the improvement comprising, the collapsible container including a collapsible rectangular framework comprising, only one pair of opposed first and second U-shaped end-channel members forming end-frames of interconnected rigid struts, and a rigid base-frame;

the rigid base-frame comprising a pair of U-shaped base channel-members, the ends of one base channel-member being insertable in the ends of the other, the base channel-members being telescopable in the lateral plane to form rigid struts interconnecting the end-frames;

the first and second end-channel members being swingable from an upright position relative to the base-frame; and, a generally rectangular sack of flexible material secured to the framework, the sack having front and rear side-walls and end-walls.

2. The container of claim 1 wherein the sack has a sleeve on each end-wall, exteriorly thereof, within which sleeve the end-frames are sheathed.

3. The container of claim 1 the sack has a cover flap and closure means to close the flap.

* * * * *